(12) United States Patent
Brouwers et al.

(10) Patent No.: US 9,745,070 B2
(45) Date of Patent: Aug. 29, 2017

(54) SYSTEMS FOR MULTIPLE ZONE HEATERS FOR ROTOR CRAFT AND METHODS OF OPERATION

(71) Applicant: The Boeing Company, Chicago, IL (US)

(72) Inventors: Edward W. Brouwers, Havertown, PA (US); Andrew A. Peterson, Media, PA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 14/538,468

(22) Filed: Nov. 11, 2014

(65) Prior Publication Data

US 2016/0130006 A1   May 12, 2016

(51) Int. Cl.
*B64D 15/12* (2006.01)
*H05B 1/02* (2006.01)
(Continued)

(52) U.S. Cl.
CPC ............. *B64D 15/12* (2013.01); *B64D 15/14* (2013.01); *H05B 1/0236* (2013.01); *H05B 3/34* (2013.01); *H05B 2214/02* (2013.01)

(58) Field of Classification Search
CPC ........ B64D 15/12; B64D 15/14; B64D 15/20; B64D 15/22; H05B 3/84; H05B 1/0236;
(Continued)

(56) References Cited

U.S. PATENT DOCUMENTS 4,410,794 A * 10/1983 Williams ............... B64D 15/14
219/201
5,709,532 A * 1/1998 Giamati ................. B64D 15/12
219/483

(Continued)

OTHER PUBLICATIONS

J. B. Werner, "The development of an advanced anti-icing/deicing capabilities for U.S. Army Helicopters. vol. 1, Design Critera and Technology Considerations", Nov. 1975, Distributed by National Information Service U.S. Department of Commerce, Retrieved from the Internet on Dec. 5, 2016, URL: http://www.dtic.mil/dtic/tr/fulltext/u2/a019044.pdf.*

(Continued)

*Primary Examiner* — Dwayne J White
*Assistant Examiner* — Sang K Kim
(74) *Attorney, Agent, or Firm* — McDonnell Boehnen Hulbert & Berghoff LLP

(57) ABSTRACT

Within examples, systems for multiple zone heaters for rotor craft are provided and methods for operation. An example system for a rotor craft comprises multiple blades coupled to a rotor and areas of the multiple blades divided into sections. A given blade includes an inboard section extending from the rotor outward and an outboard section extending from the inboard section to a tip of the given blade. The system also includes a plurality of first spanwise heater systems included on respective outboard sections of the multiple blades, a plurality of second spanwise heater systems included on respective inboard sections of the multiple blades, and a control unit coupled to the plurality of first spanwise heater systems and the plurality of second spanwise heater systems. Respective heater systems of the sections of multiple blades are energized in a sequence based on outside air temperature.

20 Claims, 12 Drawing Sheets

STEP 1

(51) Int. Cl.
*B64D 15/14* (2006.01)
*H05B 3/34* (2006.01)

(58) Field of Classification Search
CPC ...... H05B 3/34; H05B 2214/02; B64C 27/08;
B64C 27/04; B64C 27/06; B64C 27/46;
F28D 2021/0021
See application file for complete search history.

(56) References Cited

U.S. PATENT DOCUMENTS

| | | | | |
|---|---|---|---|---|
| 6,194,685 | B1* | 2/2001 | Rutherford | B64D 15/14 219/201 |
| 7,913,952 | B2* | 3/2011 | Boschet | B64D 15/12 244/134 D |
| 2005/0184193 | A1* | 8/2005 | Bourjac | B64D 15/22 244/10 |
| 2006/0226292 | A1* | 10/2006 | Houlihan | B64D 15/14 244/134 R |
| 2007/0257153 | A1* | 11/2007 | Froman | B64D 15/12 244/134 D |
| 2010/0065541 | A1* | 3/2010 | Henze | B64D 15/12 219/202 |
| 2012/0280084 | A1* | 11/2012 | Mullen | B64D 15/14 244/134 D |
| 2014/0219798 | A1* | 8/2014 | Beaven | B64D 15/12 416/1 |
| 2016/0336748 | A1* | 11/2016 | Andrieu | H02J 3/02 |

OTHER PUBLICATIONS

H. J.Coffman Jr., "Review of Helicopter Icing Protection Systems", Oct. 17-19, 1983, AIAA Aircraft Design, Systems and Technology Meeting, Retrieved from the Internet on Dec. 5, 2016, URL: http://arc.aiaa.org/doi/pdf/10.2514/6.1983-2529.*

Neville, et al. "Icing Trial for Qualification of the New AW101 Main and Tail Rotors, Utilizing the Helicopter Icing Spray Systems (HISS)", Presented at the American Helicopter Society 66th Annual Forum, Phoenix, AZ, May 11-13, 2010.

2006 RAE Rotorcraft Operations in Icing Environments: NH90 Blade Protection and Ongoing Research, Jun. 28-29, 2006.

Rauch et al., "Advanced Technologies for High Performance NH90 Blades", Presented at the American Helicopter Society 59th Annual Forum, Phoenix, May 6-8, 2003.

Flemming et al., "Sikorsky S-92A and S-76D Helicopter Rotor Ice Protection Systems", SAE Aircraft and Engine Icing International Conference, Seville, Spain, Sep. 24-27, 2007.

Flemming et al., "US Army UH-60M Main Rotor Ice Protection System", Presented at the 2007 SAE Aircraft and Engine Icing International Conference, Sep. 25, 2007.

Nguyen et al., "Development of an Improved Deice System for UH-60 Rotor Blades", Presented at the American Helicopter Society 66th Annual Forum, Phoenix, May 11-13, 2010.

Tracy et al., "Development and Certification of the EH101 for Operation in Natural Icing", 1995 International Icing Symposium 1995.

* cited by examiner

STEP 1

STEP 2

STEP 3

STEP 4

STEP 1

STEP 2

STEP 3

STEP 4

SYSTEMS FOR MULTIPLE ZONE HEATERS FOR ROTOR CRAFT AND METHODS OF OPERATION

GOVERNMENT LICENSE RIGHTS

This invention was made with government support under W911W6-08-2-0005 (with AATD, now Army Aviation Development Directorate (ADD)) awarded by the Department of Defense. The government has certain rights in the invention.

FIELD

The present disclosure relates generally to an aircraft or rotorcraft system that provides anti-icing or de-icing. In further examples, methods and systems for de-icing single and multi-rotor vehicles are provided by focusing power to the systems when needed.

BACKGROUND

Super-cooled water droplets can freeze on impact to a leading edge of a rotor blade or a rotorcraft when a combination of temperatures close to freezing, high speeds, and high cloud water concentrations occur. Helicopter and tilt-rotor blades or rotorcraft operating at temperatures below freezing tend to collect ice along a majority of the leading edge of the blades. As ice accumulation alters a stagnation point geometry of the blades, performance of the vehicle decreases. Unevenly distributed rotor ice adhesion can create increases in drag, flow separation, and high vibration levels. The increase in drag generated by accreted ice increases torque required to maintain lift conditions of the vehicle. Transmission or engine limits can be reached as ice thickness increases in this dangerous fluctuating environment making maintaining a given flying condition difficult for a pilot.

Ice shedding is another problem introduced by ice accretion on rotating blades. Shear stresses created by centrifugal forces at an interface between ice and the leading edge of an airfoil increases linearly with ice thickness. When shear stresses exceed an ultimate adhesive shear strength of the ice, shards of ice are released. Impact of shed ice could cause damage to the aircraft. As ice sheds unevenly, rotor mass unbalance introduces undesired vibrations and changes in the handling of the vehicle.

To avoid large amounts of ice formation on the rotor blades, industry has adopted a standard de-icing system for a limited number of helicopter models. The industry standard de-icing system uses thermal energy to melt accreted ice. Electro thermal de-ice systems are the only Federal Aviation Administration (FAA) certified and Department of Defense (DoD) accepted ice protection systems for rotorcraft.

The thermal de-icing mechanism is only run periodically in order to avoid large power consumption or excessive heating of the leading edge blade. The ice thickness can reach up to 1 cm before the thermal system is turned on. Such a system requires large amounts of energy (e.g., 3.9 W/cm$^2$ or 25 W/in$^2$) and contributes to an undesired increase in the overall weight and cost of the blade. The de-ice system may not allow for safe flight throughout the entire icing envelope, since the system may not keep up with severe ice accretion rates. Due to these drawbacks, many helicopters do not employ any de-icing capabilities, limiting operations of these vehicles under adverse conditions.

For rotorcraft employing de-icing systems, due to the requirement of significant amounts of power to operate such electro thermal de-ice systems, multi-rotor aircraft typically have their rotors de-iced in sequence. This reduces a peak power demand on the aircraft, but the power requirement still limits the use of the de-icing system. Furthermore, the alternating de-ice approach may not be able to keep up with severe ice accretion rates and ultimately may limit the all-weather capability of the aircraft.

SUMMARY

In one example, a system for a rotor craft is provided comprising multiple blades coupled to a rotor and areas of the multiple blades divided into sections, and a given blade includes an inboard section extending from the rotor outward and an outboard section extending from the inboard section to a tip of the given blade. The system also includes a plurality of first spanwise heater systems included on respective outboard sections of the multiple blades, a plurality of second spanwise heater systems included on respective inboard sections of the multiple blades, and a control unit coupled to the plurality of first spanwise heater systems and the plurality of second spanwise heater systems. Respective heater systems of the sections of multiple blades are energized in a sequence based on outside air temperature and icing severity.

In another example, a system is provided comprising multiple blades coupled to a rotor and areas of the multiple blades divided into sections, and a given blade includes an inboard section extending from the rotor outward and an outboard section extending from the inboard section to a tip of the given blade. The system also comprises a plurality of first spanwise heater systems included on respective outboard sections of the multiple blades, a plurality of second spanwise heater systems included on respective inboard sections of the multiple blades, and a control unit coupled to the plurality of first spanwise heater systems and the plurality of second spanwise heater systems. The control unit is configured to cause respective heater systems of the sections of multiple blades to be energized in a sequence based on the sections being inboard or outboard and on one or more icing conditions of an environment of the system.

In still another example, a method is provided comprising detecting one or more icing conditions of an environment of a rotor craft, and the rotor craft includes multiple blades coupled to a rotor and the multiple blades include a first set of blades and a second set of blades, and areas of the multiple blades are divided into sections such that a given blade includes an inboard section extending from the rotor outward and an outboard section extending from the inboard section to a tip of the given blade. The method also comprises providing, by a control unit, power to a plurality of first spanwise heater systems included on respective outboard sections of the first set of blades and the second set of blades, and providing, by the control unit, power to a plurality of second spanwise heater systems included on respective inboard sections of the first set of blades. The method further comprises providing, by the control unit, power to the plurality of first spanwise heater systems included on the respective outboard sections of the first set of blades and the second set of blades, and providing, by the control unit, power to a plurality of second spanwise heater systems included on respective inboard sections of the second set of blades.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Within examples, de-icing systems and methods of operation are provided for use on rotor craft. An example rotor de-ice system includes heaters installed in a leading edge of a blade, and the heaters may be about 0.0025" thick to be integrated in an upper spar of a composite blade layup. For de-ice operation, a goal of the heaters is to quickly elevate a temperature of the ice/rotor interface above about 32° F. A temperature of greater than about 40° F. is usually sought. The heating process melts an interface of the ice, allowing centrifugal force inherent to the rotating blades to remove the ice from a surface of the blade. For this reason, a layer of ice is usually detected prior to heater activation. Heat applied too slowly or to thin ice accretions may not remove ice because centrifugal forces may not be large enough to overcome the ice/rotor bond. In such instances, ice may then locally melt and liquid water can flow to other portions of the blade and refreeze. This process, called runback, can be problematic because a refreeze location may be outside of an area protected by the heaters and the ice cannot be removed with additional heater pulses.

Depending on blade structure, an electro thermal ice protection system may require power densities in the range of about 25 WSI (Watts per square inch) to achieve a required surface temperature with minimum power-on times. This can place a large demand on the aircraft electrical system. Within examples, to reduce a peak power demand, the heaters are divided into areas or zones. These zones are energized in a specific sequence to de-ice the blade, and this sequence can be tailored to icing conditions.

Example zones on a blade include two spanwise zones of an inboard zone and an outboard zone. The spanwise configuration may have the zones run from a blade root to a blade tip. Heaters on multiple blades are de-iced in a sequence using a 3-phase AC power system or a DC power source due to blade design. Cycle time among the heaters is controlled to remove continuously accreting ice on the blades and prevent ice buildup. A root section of the blade may be able to tolerate longer times between the heater firings since this section typically accretes ice at lower rates.

Figure 1:
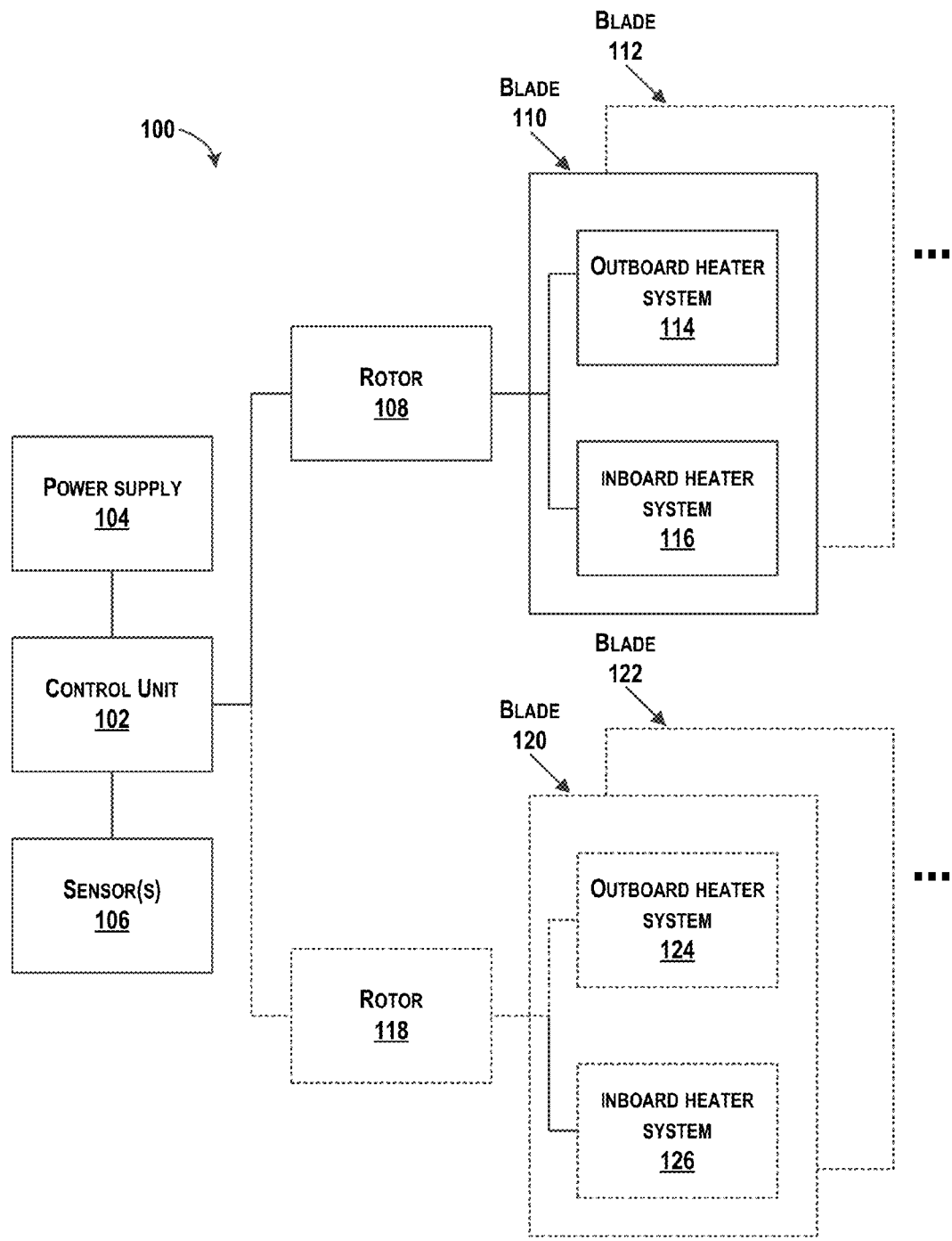
FIG. 1 is a block diagram of an example aircraft, according to one embodiment.

Referring now to the figures, FIG. 1 is a block diagram of an example aircraft 100, according to one embodiment. The aircraft 100 includes a control unit 102 coupled to a power supply 104 and sensor(s) 106. The control unit 102 is further coupled to a rotor 108 that connects to blades 110 and 112. Each blade 110 and 112 may include an outboard heater system 114 and an inboard heater system 116. Within some examples, the aircraft 100 may include multiple rotors (e.g., such as a forward and an aft rotor), and thus, FIG. 1 illustrates an optional second rotor 118 coupled to the control unit 102, that also includes blades 120 and 122. Each blade 120 and 122 also includes an outboard heater system 124 and an inboard heater system 126.

The aircraft 100 thus may be representative of a single rotor craft with an even number of multiple blades (e.g., four total blades, or two sets of blades) or of a multiple rotor craft (e.g., two rotors including a forward rotor and an aft rotor, where each rotor may include three or more blades, a lateral twin helicopter with a left and right rotor where each rotor may include three or more blades or a coaxial helicopter with an upper and lower rotor where each rotor may include three or more blades).

The control unit 102 may be configured to operate the heater systems on the blades 110, 112, 120, and 122, and to provide power from the power supply 104 to do so. The control unit 102 may receive outputs from the sensors 106 to determine when to initiate operation of the heater systems. The sensors 106 may include temperature sensors to detect ambient air temperature, or water content sensors to detect an amount of water content in the air. The sensors 106 may more generally include sensors for determining icing conditions of an environment of the aircraft 100.

Each blade 110, 112, 120, and 122 includes an example outboard heater system and an example inboard heater system. For example, areas of the blades may be divided into sections including an inboard section extending from the rotor outward and an outboard section extending from the inboard section to a tip of the given blade. The outboard heater systems 114 and 124, and the inboard heater systems 116 and 126 may each be configured as spanwise heater systems, and the control unit 102 may control operation of the heater systems in a sequence based on outside air temperature, detected icing conditions of the environment, or in a manner such that operation is based on whether the sections are inboard or outboard and on one or more icing conditions of the environment of the system.

Figure 2:
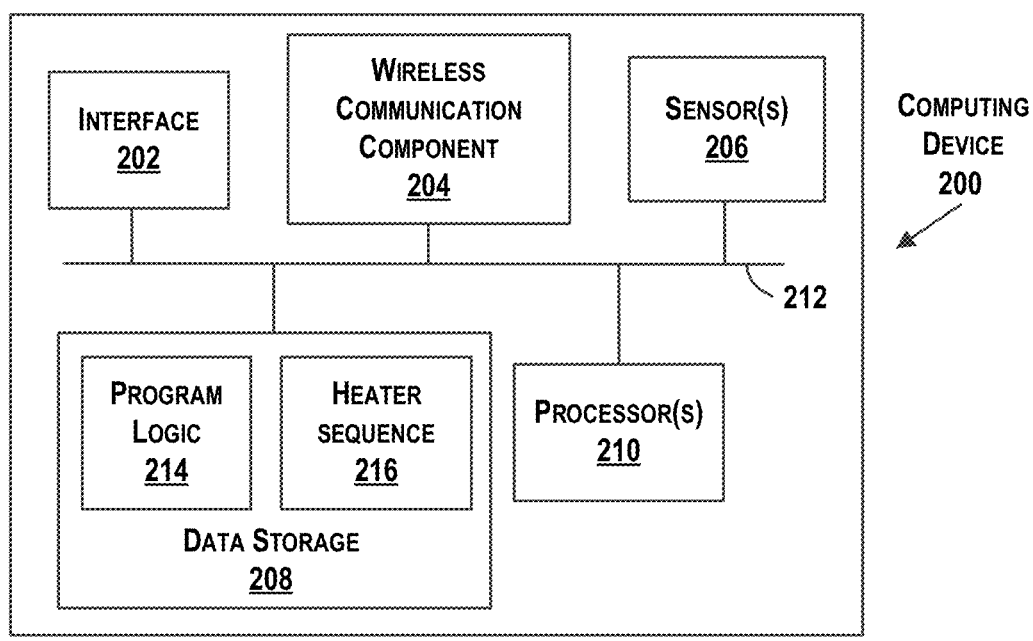
FIG. 2 illustrates a schematic drawing of an example computing device, according to one embodiment.

FIG. 2 illustrates a schematic drawing of an example computing device 200. The computing device 200 in FIG. 2 may represent the control unit 102 shown in FIG. 1. In some examples, some components illustrated in FIG. 2 may be distributed across multiple computing devices. However, for the sake of example, the components are shown and described as part of one example device 200.

The computing device 200 may include an interface 202, a wireless communication component 204, sensor(s) 206, data storage 208, and a processor 210. Components illustrated in FIG. 2 may be linked together by a communication link 212. The computing device 200 may also include hardware to enable communication within the computing device 200 and between the computing device 200 and another computing device (not shown), such as a server entity. The hardware may include transmitters, receivers, and antennas, for example.

The interface 202 may be configured to allow the computing device 200 to communicate with another computing device (not shown), such as a server or land-based device. Thus, the interface 202 may be configured to receive input data from one or more computing devices, and may also be configured to send output data to the one or more computing devices. In some examples, the interface 202 may also maintain and manage records of data received and sent by the computing device 200. The interface 202 may also include a receiver and transmitter to receive and send data.

The wireless communication component 204 may be a communication interface that is configured to facilitate wireless data communication for the computing device 200 according to one or more wireless communication standards. For example, the wireless communication component 204 may include a Wi-Fi communication component, or a cellular communication component. Other examples are also possible, such as proprietary wireless communication devices.

The sensor 206 may include one or more sensors, or may represent one or more sensors included within the computing device 200. Example sensors include air temperature sensors, water content sensors, etc., or any of the sensors shown in FIG. 1 may be incorporated into the computing device 200. Additional sensors may also be included, such as a power monitor sensor for monitoring power draw of the power supply, shown in FIG. 1, to each heater system.

The data storage 208 may store program logic 214 that can be accessed and executed by the processor 210. The data storage 208 may also store collected sensor data or a heater sequence data 216 for energizing the heater systems in a desired sequence.

Figure 3A:
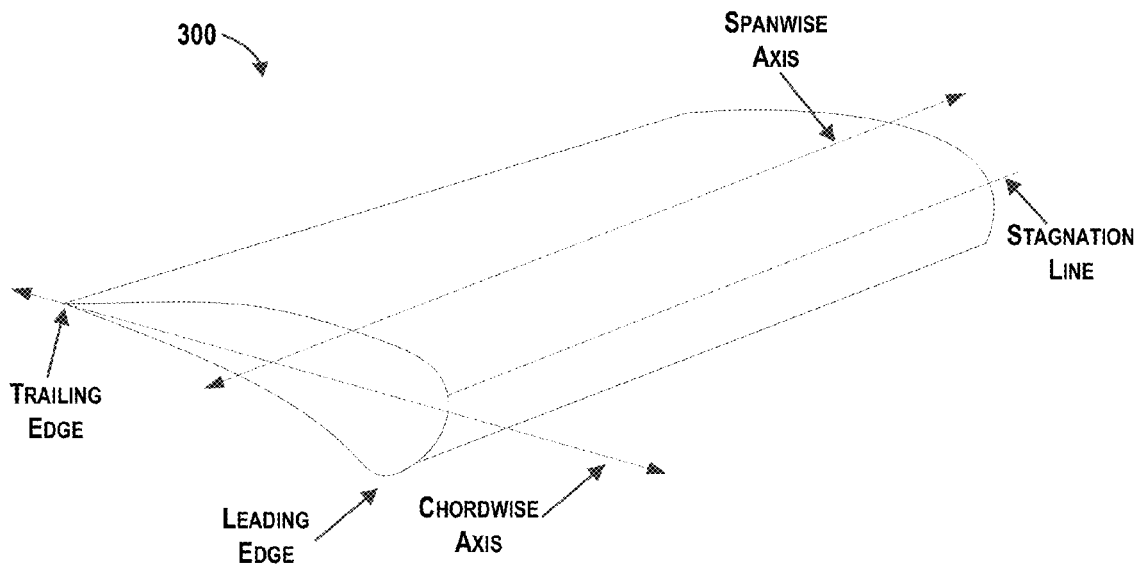
FIG. 3A illustrates an example blade, according to one embodiment.

FIG. 3A illustrates an example blade 300, according to one embodiment. A spanwise and chordwise axis are illustrated, and a leading edge is on a side on a stagnation line, while a trailing edge is opposite the leading edge. Heater systems may be provided on a surface or internal to the blade.

Figure 3B:
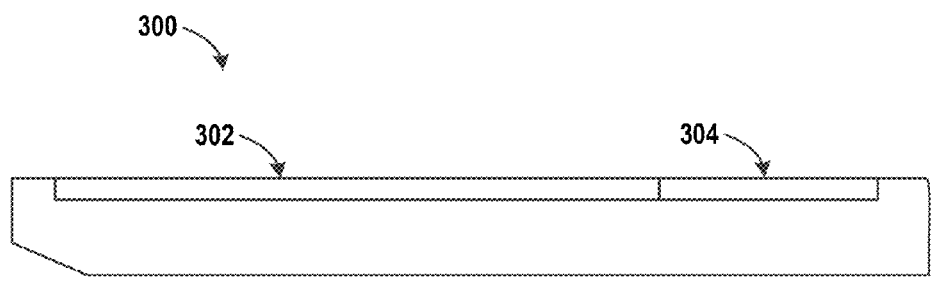
FIG. 3B illustrates a side view of the example blade with heater systems, according to one embodiment.

FIG. 3B illustrates a side view of the example blade 300 with heater systems. An inboard heater system 302 is provided on an inboard section that extends from a rotor outward, and an outboard heater system 304 is provided on an outboard section that extends from the inboard section to a tip of the blade 300.

Figure 4A:
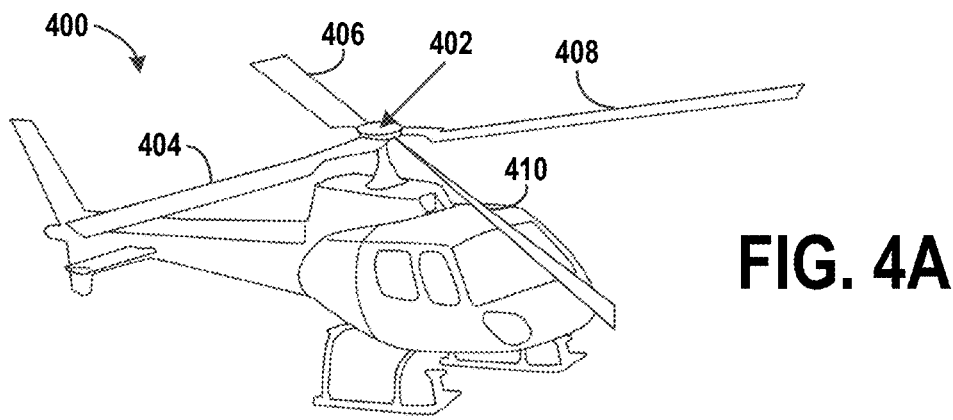
FIG. 4A is an example rotor craft with a main single rotor and four blades, according to one embodiment.
Figure 4B:
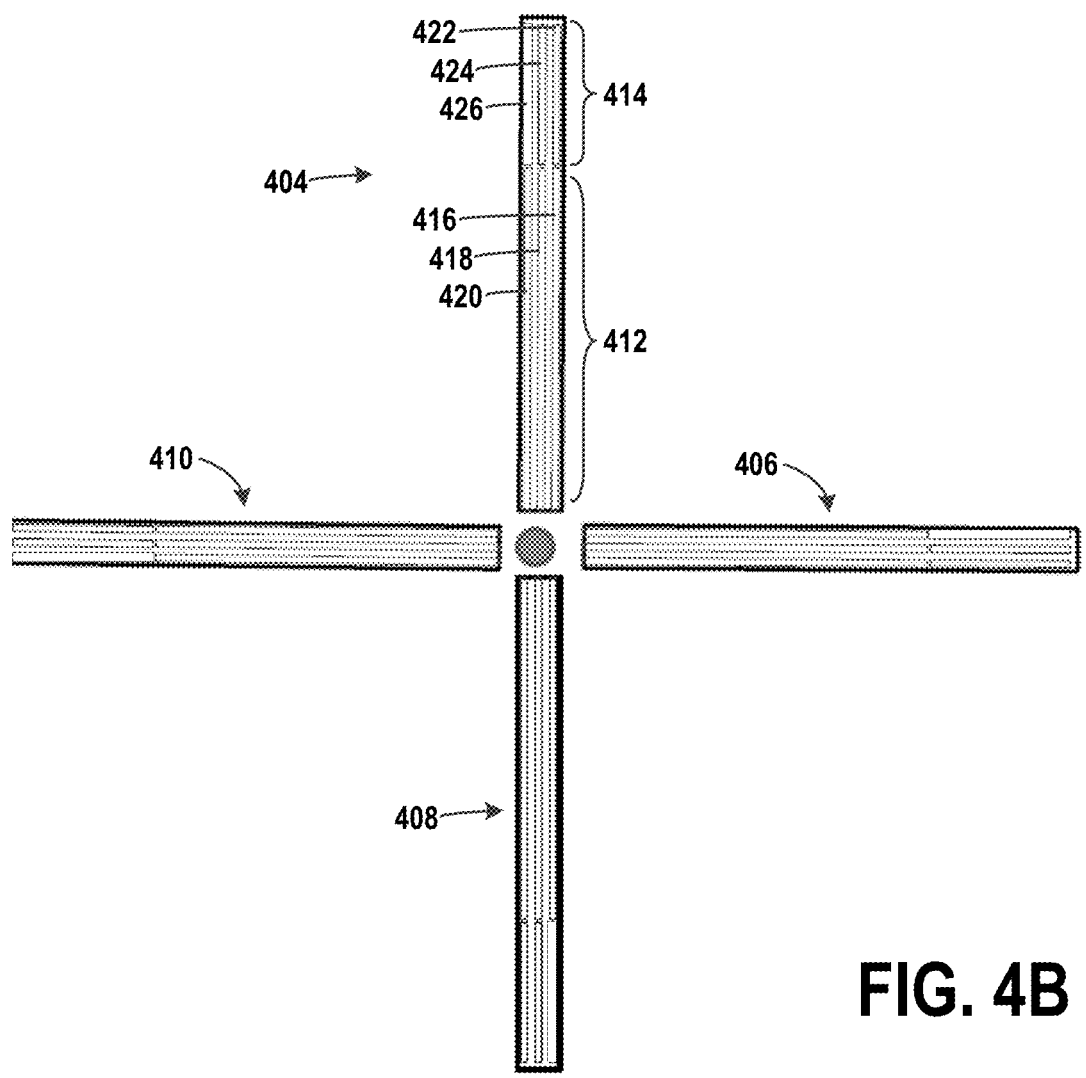
FIG. 4B illustrates the example blades of the rotor craft in FIG. 4A, according to one embodiment.

FIG. 4A is an example rotor craft 400 with a single rotor 402 and four blades 404, 406, 408, and 410, according to one embodiment. FIG. 4B illustrates the example blades 404, 406, 408, and 410 of the rotor craft 400 in FIG. 4A, according to one embodiment.

In FIG. 4B, each of the blades is divided into an inboard section 412 that extends from the rotor outward, and an outboard section 414 that extends from the inboard section 412 to a tip of the blade 404. Each of the inboard section 412 and outboard section 414 (of each blade) includes heater systems configured in a spanwise manner such that the heaters extend along a length of the blade. For example, as shown on blade 404, the inboard section 412 includes spanwise heater systems 416, 418, and 420, and the outboard section 414 includes spanwise heater systems 422, 424, and 426. All blades may be configured in the same manner. In addition, although only three heater systems are shown for each section, more or fewer heaters may be provided. Each of the heater systems 416-426 are coupled to a control unit, such as shown in FIG. 1. Each of the heater systems 416-426 may be individually controlled to limit power consumed during deicing operations.

Operation of the heater systems 416-426 on each of blades 404-410 may be performed in a sequence based on measured water content indicative of icing severity, and/or air temperatures. For example, based on an air temperature of less than 32° F. (or about at or below freezing conditions), the heater systems may be activated. The sequence of operations may be repeated until icing conditions are exited for the system to shut down.

FIGS. 5A-5D illustrate an example operation sequence of heater systems for a single rotor aircraft. The blades illustrated in FIGS. 5A-5D are the blades 404-410 as described in FIGS. 4A-4B. The multiple blades may include a first set of blades 404 and 408 (opposite one another) and a second set of blades 406 and 410 (opposite one another).

Figure 5A:
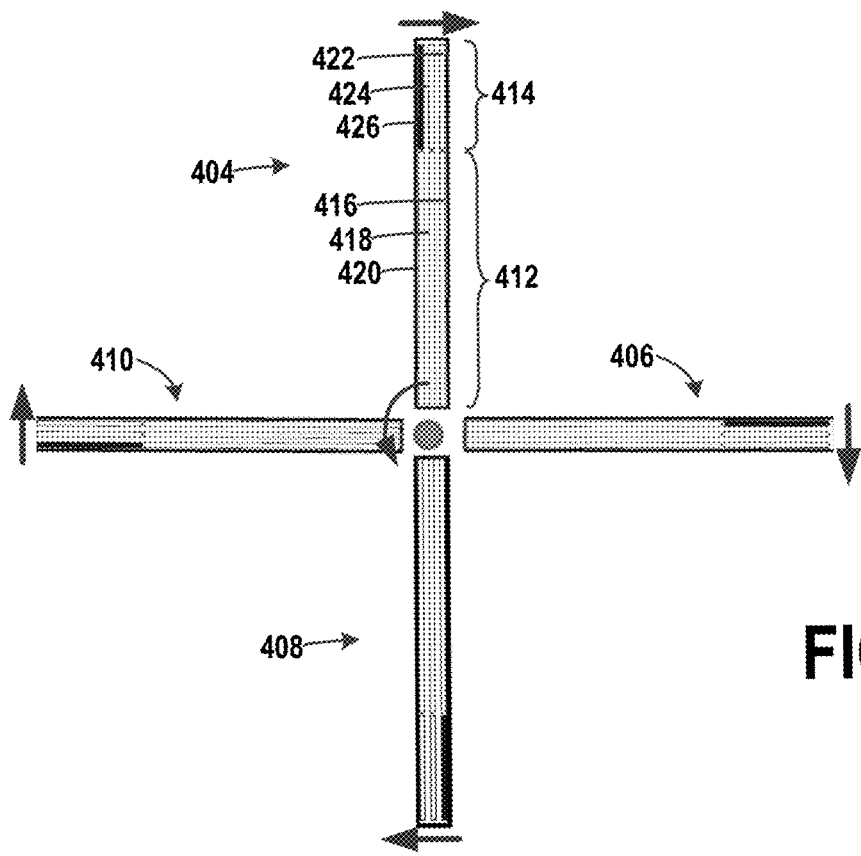
FIGS. 5A-5D illustrate an example operation sequence of heater systems for a single rotor aircraft, according to one embodiment.

In a first step, as shown in FIG. 5A, outboard sections of the first set of blades 404 and 408, and outboard sections of the second set of blades 406 and 410 may be energized. Thus, all heater systems on outboard sections may be energized. Within examples, respective heater systems are energized in a chordwise manner from a leading edge to a trailing edge of a respective blade. For example, as shown on blade 404, within the outboard section 414, heater 426 may be energized first, followed by heater 424, and then followed by heater 422. The remaining outboard heaters on blades 406, 408, and 410 may be energized in the order shown by the arrows illustrated in FIG. 5A. In this manner, less power is needed to energize all heaters simultaneously, and leading edges of the blades can be energized first.

Figure 5B:
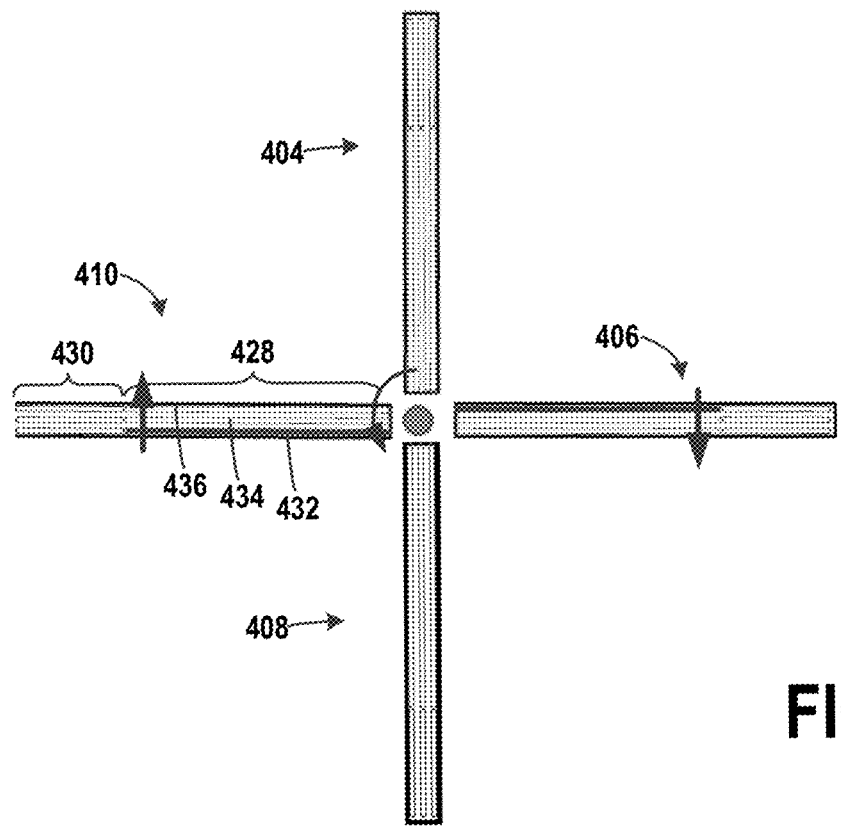

In a second step, as shown in FIG. 5B, inboard sections of a set of blades 406 and 410 may be energized. Thus, following energizing all outboard sections, one set of blades can have respective inboard sections energized. For example, blade 410 is illustrated with outboard section 430 and inboard section 420, and the inboard section 428 includes heater systems 432, 434, and 436. The inboard heater systems 432, 434, and 436 can be energized in an order such that heater 432 is first, followed by heater 434, and then heater 436 so as to energize from a leading edge to a trailing edge when the rotor rotates the blades counterclockwise as shown in FIG. 5B.

Figure 5C:
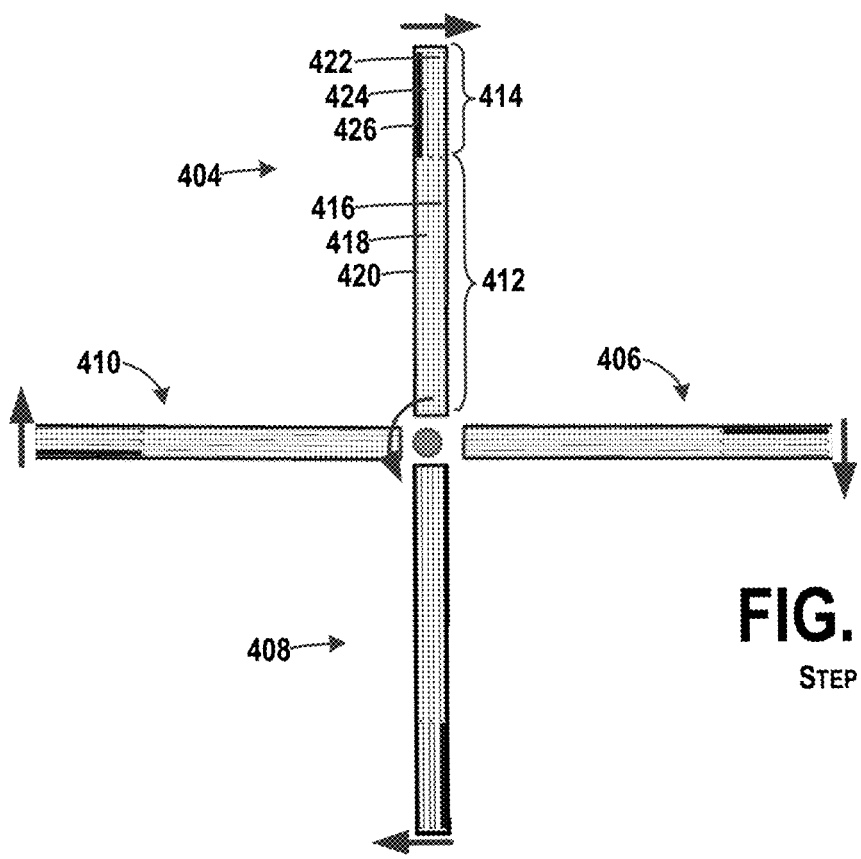

In a third step, as shown in FIG. 5C, the outboard sections of the first set of blades 404 and 408, and the outboard sections of the second set of blades 406 and 410 are again energized. This is a repeat of step 1, as shown in FIG. 5A.

Figure 5D:
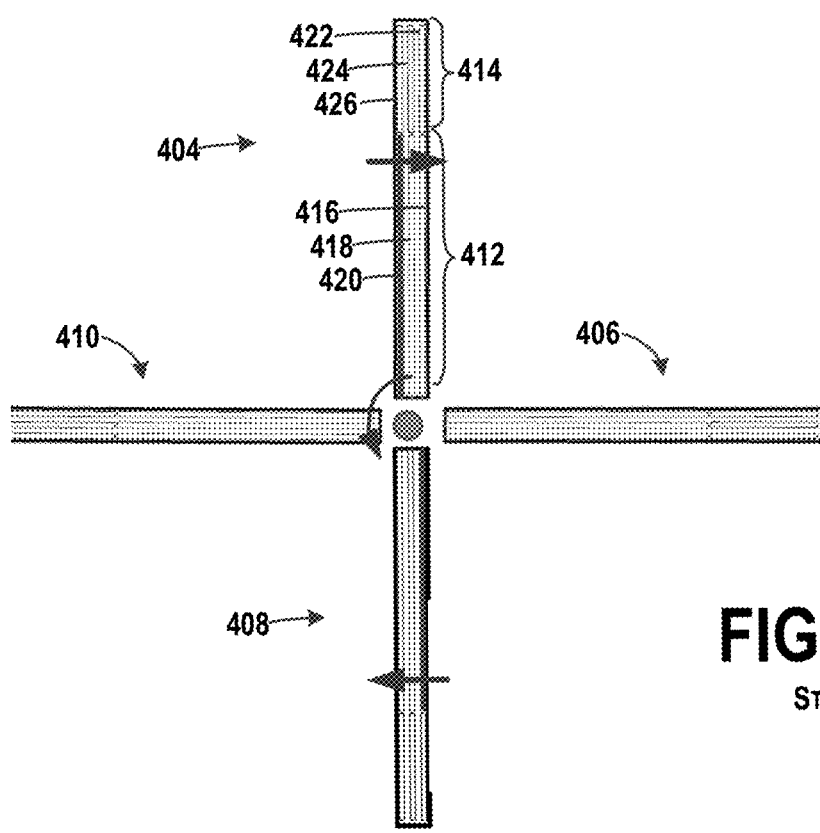

In a fourth step, as shown in FIG. 5D, inboard sections of a set of blades 404 and 408 are energized. Thus, the two remaining inboard sections that were not energized in the second step are now energized to rotate through all sections of all blades. As shown in FIG. 5D, the inboard section 412 may be energized such that heater 420 is first, followed by heater 418, and then heater 416.

Using the example sequence as shown in FIGS. 5A-5D, heater systems of the sections of multiple blades are energized in a sequence based on outside air temperature and icing severity, and the sequence includes heating outboard sections of the multiple blades more frequently than heating inboard sections of the multiple blades. The outboard sections are heated twice as much, within the sequence. Following heating of an inboard section, all outboard sections are heated. Inboard sections of each set of blades are only heated every other time in the sequence so as to reduce an amount of heating of the inboard sections, which enables additional heating to be performed on the outboard sections while using less total power.

Steps 1-4 as shown in FIGS. 5A-5D are repeated until the aircraft exits an icing cloud, or until icing conditions are no longer present, for example. Within some examples, based on the outside air temperature being above a threshold value, e.g., 40° F., the respective heater systems of the sections of multiple blades may be energized in a sequence in which heater systems included on respective outboard sections of the blades are removed from the sequence. In this example, referred to as warm weather icing conditions, heating of the tips of the blades may not be necessary and power can be saved. Within other examples, based on the outside air temperature being below a threshold value, e.g., 10° F., the respective heater zones of the sections of multiple blades may be energized in a sequence in which heater systems included on respective inboard sections of the blades are removed from the sequence. In this example, more attention can be paid to outboard sections due to extreme icing conditions. Removal of a section from the sequence may be for only one (or more) cycles through the sequence, and the section can be re-introduced to the sequence within later cycles.

Figures 6A, 6B:
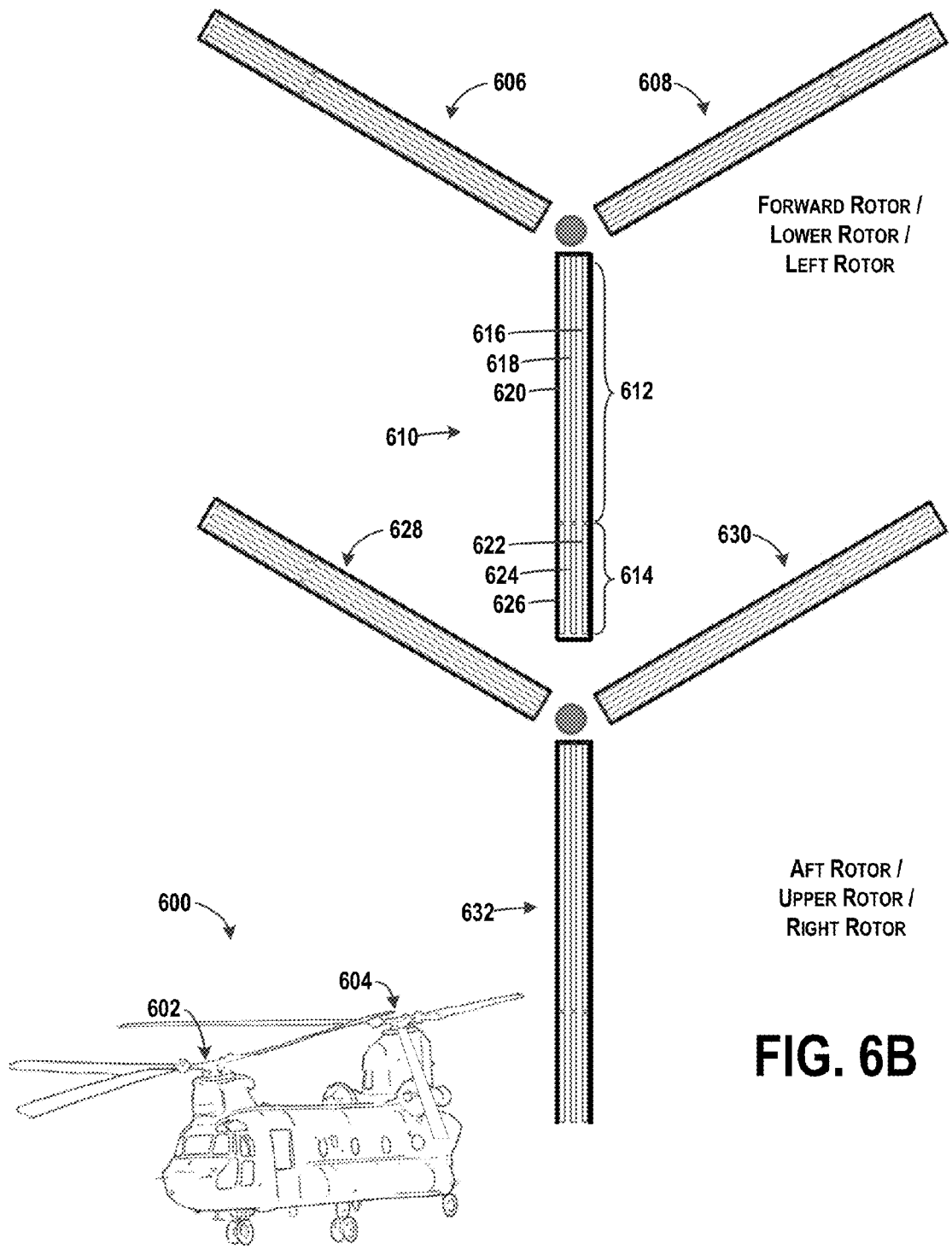
FIG. 6A is an example rotor craft with multiple rotors and three blades for each rotor, according to one embodiment.
FIG. 6B illustrates example blades of the forward rotor, and example blades of the aft rotor of the rotor craft in FIG. 6A, according to one embodiment.

FIG. 6A is an example rotor craft 600 with multiple rotors 602 and 604 and three blades for each rotor, according to one embodiment. In FIG. 6A, the rotor craft 600 includes a forward rotor 602 and an aft rotor 604. As shown, the forward rotor 602 may be provided proximal to a front end of the rotor craft 600 and the aft rotor 604 may be provided proximal to a rear of the rotor craft 600. FIG. 6B illustrates example blades 606, 608, and 610 of the forward rotor, and example blades 628, 630, and 632 of the aft rotor, according to one embodiment. Although FIG. 6A illustrates an aircraft with a forward and aft rotor, the heater system described below may alternatively or additionally be implemented on a multiple rotor aircraft in which the rotors are configured as a left and a right rotor, or as an upper and a lower rotor, for example.

In FIG. 6B, each of the blades is divided into an inboard section 612 that extends from the rotor outward, and an outboard section 614 that extends from the inboard section 612 to a tip of the blade 610. Each blade of each rotor (forward and aft) may be configured in the same manner. Each of the inboard section 612 and outboard section 614 (of each blade) includes heater systems configured in a spanwise manner such that the heaters extend along a length of the blade. For example, as shown on blade 610, the inboard section 612 includes spanwise heater systems 616, 618, and 620, and the outboard section 614 includes spanwise heater systems 622, 624, and 626. All blades may be configured in the same manner. In addition, although only three heater systems are shown for each section, more or fewer heaters may be provided. Each of the heater systems 616-626 are coupled to a control unit, such as shown in FIG. 1. Each of the heater systems 616-626 for each blade and each rotor may be individually controlled to limit power consumed during deicing operations.

Operation of the heater systems on each of blades 604-610 may be performed in a sequence based on measured water content indicative of icing severity, and/or air temperatures. For example, based on an air temperature of less than 32° F. (or about at or below freezing conditions), the heater systems may be activated. The sequence of operations may be repeated until icing systems are exited for the system to shut down.

FIGS. 7A-7D illustrate an example operation sequence of heater systems for a multiple rotor aircraft. The blades illustrated in FIGS. 7A-7D are the blades 606, 608, 610, 628, 630, and 632 as described in FIGS. 6A-6B. Each of the forward rotor and the aft rotor includes a set of the blades.

Figure 7A:
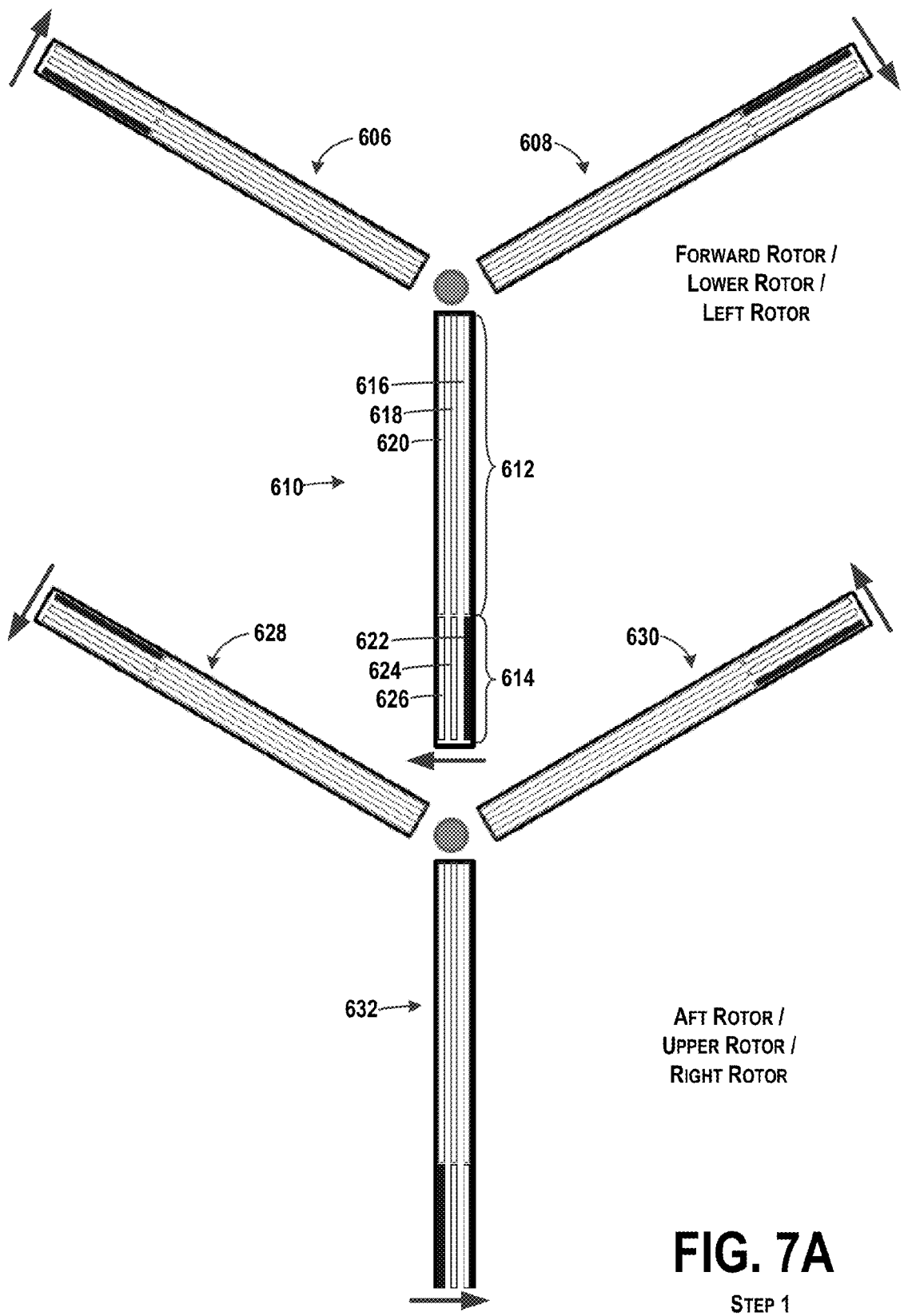
FIGS. 7A-7D illustrate an example operation sequence of heater systems for a multiple rotor aircraft, according to one embodiment.

In a first step, as shown in FIG. 7A, outboard sections of the multiple blades on the forward rotor and on the aft rotor are energized. Thus, all heater systems on outboard sections may be energized. Within examples, respective heater systems are energized in a chordwise manner from a leading edge to a trailing edge of a respective blade. For example, as shown on blade 610, within the outboard section 614, heater 622 may be energized first, followed by heater 624, and then followed by heater 626. The remaining outboard heaters on the other blades may be energized in the order shown by the arrows illustrated in FIG. 7A. In this manner, less power is needed to energize all heaters simultaneously, and leading edges of the blades can be energized first. In addition, three cycles may be performed to execute the first step in this sequence, although more or fewer cycles may be used depending on the number of heater systems per section.

Figure 7B:
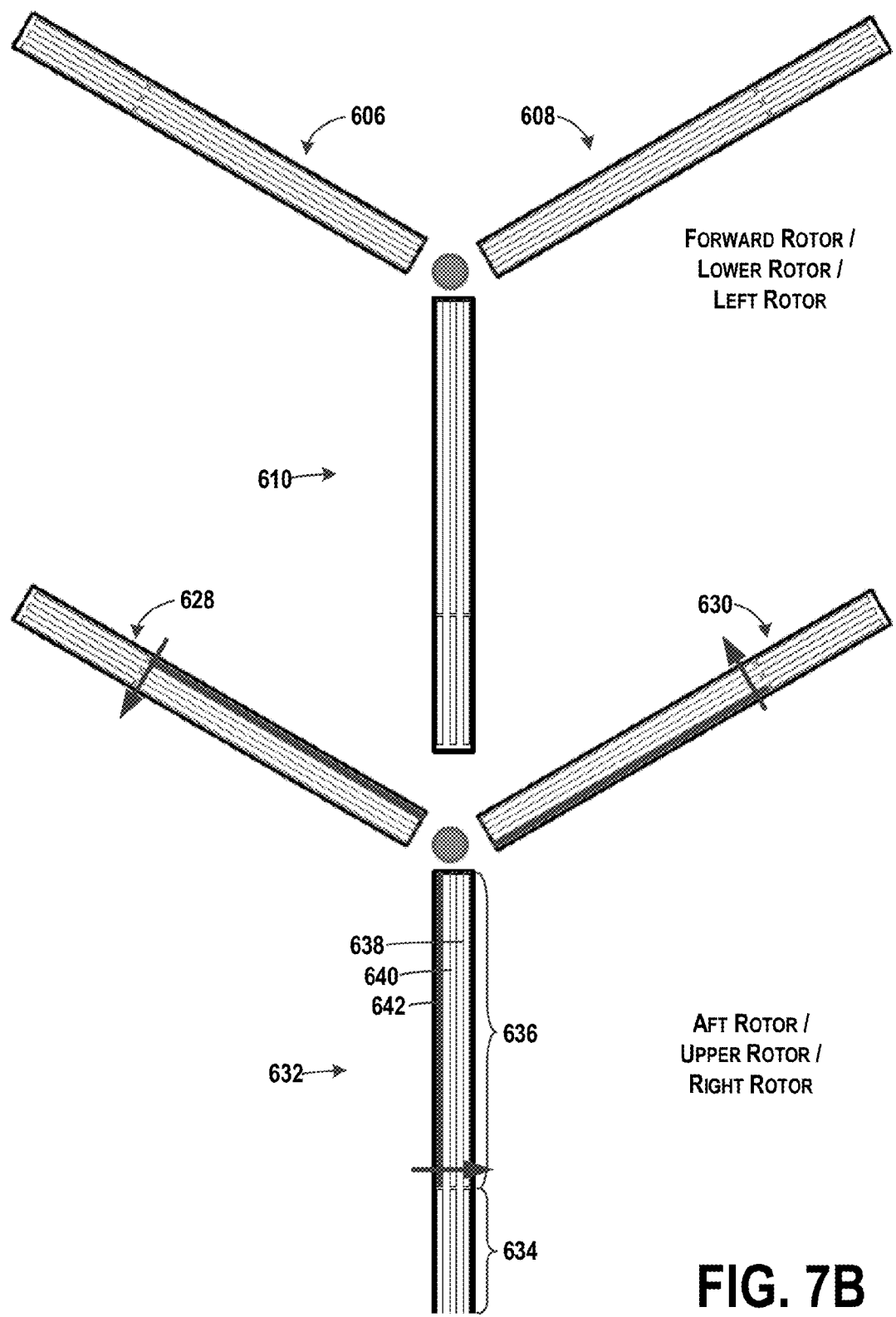

In a second step, as shown in FIG. 7B, inboard sections of the set of multiple blades on the aft rotor are energized. Thus, following energizing all outboard sections, the aft rotor has respective inboard sections energized. For example, blade 632 is illustrated with outboard section 634 and inboard section 636, and the inboard section 636 includes heater systems 638, 640, and 642. The inboard heater systems 638, 640, and 642 can be energized in an order such that heater 642 is first, followed by heater 640, and then heater 638, and remaining inboard sections are energized in the order shown by arrows in FIG. 7B. Again, three cycles are used to perform the second step in this sequence due to three heater systems installed on the aft inboard sections.

Figure 7C:
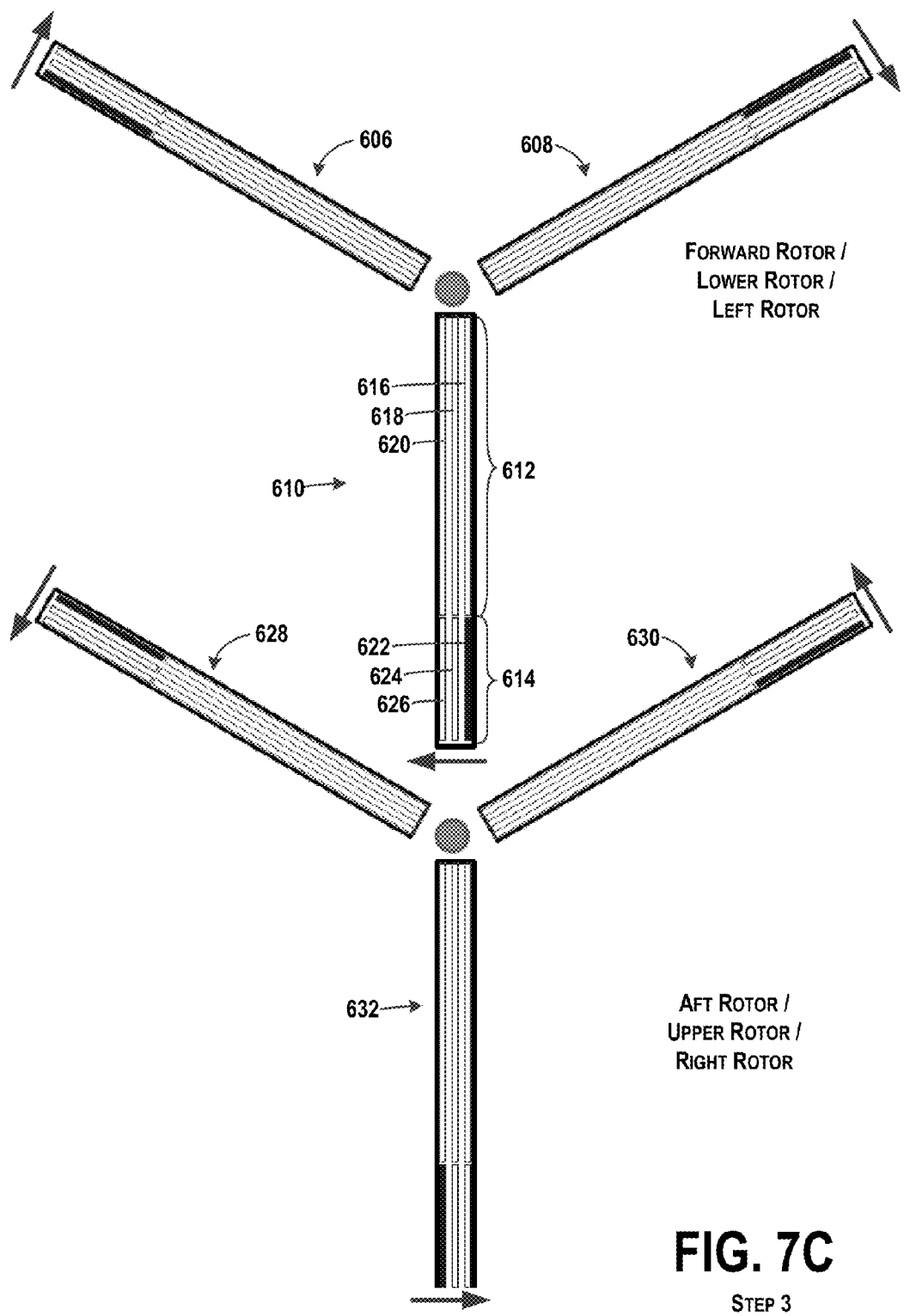

In a third step, as shown in FIG. 7C, the outboard sections of the set of multiple blades on the forward rotor and on the aft rotor are again energized. This is a repeat of step 1, as shown in FIG. 7A.

Figure 7D:
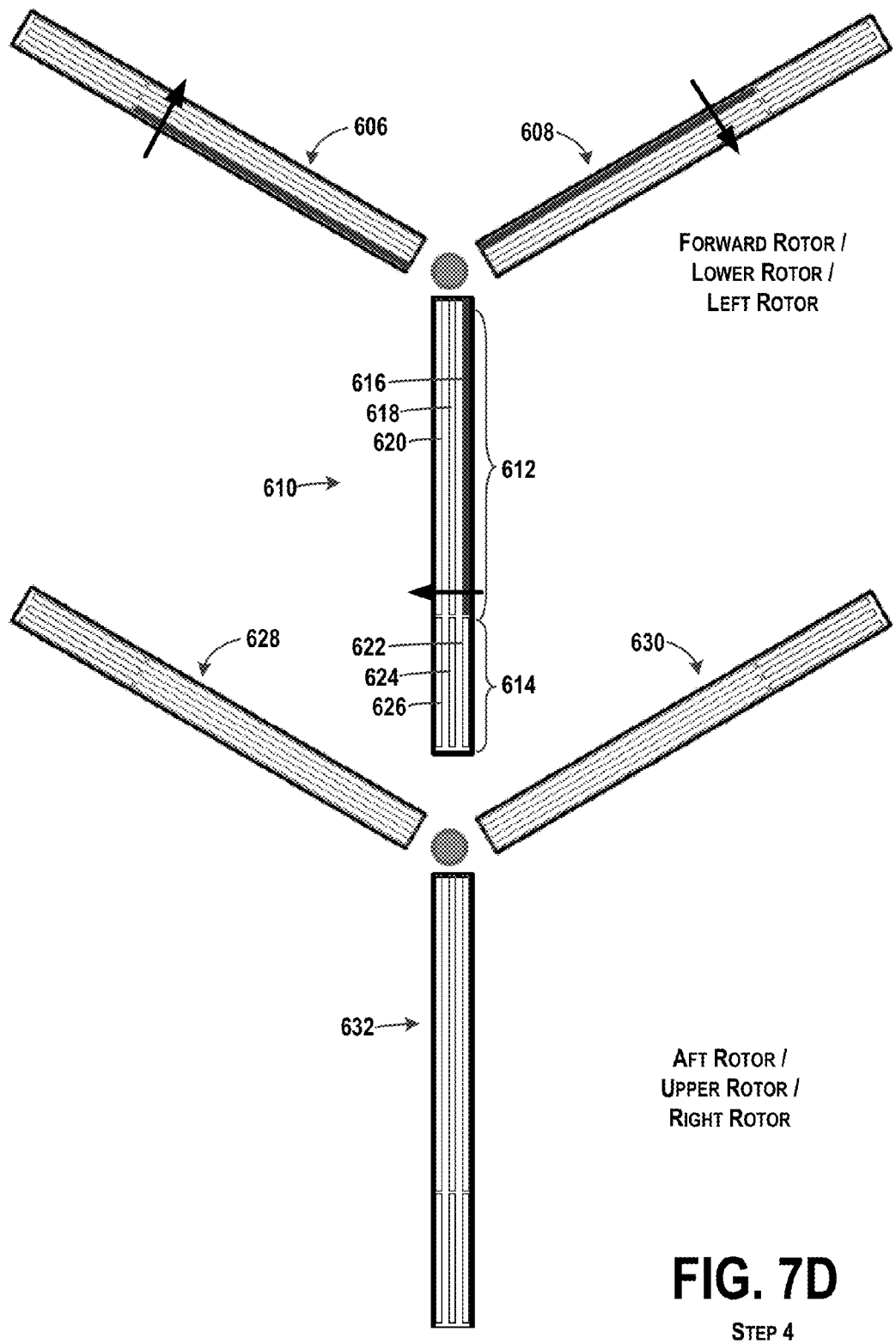

In a fourth step, as shown in FIG. 7D, inboard sections of the set of multiple blades on the forward rotor are energized. Thus, the two remaining inboard sections that were not energized in the second step are now energized to rotate through all sections of all blades. As shown in FIG. 7D, the inboard section 612 of the forward rotor may be energized such that heater 616 is first, followed by heater 618, and then heater 620. Remaining inboard sections of blades on the forward rotor are energized in the order shown by the arrows in FIG. 7D.

Steps 1-4 as shown in FIGS. 7A-7D are repeated until the aircraft exits an icing cloud, or until icing conditions are no longer present, for example. Within some examples, a peak power demand reduction of up to 40% may be achieved (compared to systems without dual heating zones) with the split zone concept described herein Using the configuration as shown in FIGS. 7A-7D, respective heater systems of the sections of the multiple blades are energized in a chordwise manner such that for the outboard sections and the inboard sections of the set of multiple blades on the forward rotor, sections are energized from a leading edge to a trailing edge of a respective blade, and for the outboard sections and the inboard sections of the set of multiple blades on the aft rotor, sections are energized from a leading edge to a trailing edge of a respective blade, based on a rotational direction of the respective rotors.

In some examples, such as during warm weather ice protection (e.g., when air temperatures are close to about 32° F., outboard sections of the blades (e.g., the tips) may not need to be heated due to kinetic heating so power can be saved by not energizing such sections. In such examples, heater systems on the forward and aft rotor blades may be energized in a sequence including inboard sections of the aft rotor (three cycles to cover the three independent heaters), and followed by inboard sections of the forward rotor (three cycles to cover the three independent heaters).

In other examples, heating of inboard sections of the multiple blades is removed from the sequence allowing the outboard sections of the set of multiple blades on the forward rotor and on the aft rotor to be energized more frequently, such as when outside air temperatures are below a threshold and/or more severe icing conditions are present.

Within examples, a sample element labeling is provided below in Table 1 in which inboard and outboard sections of the forward and aft rotors are divided into zones including zones labeled 1-6 (starting from the rotor and moving out to the tip). More or fewer zones may be included in the root and tip sections.

TABLE 1

| Rotor | Zone | ID | Rotor | Zone | ID | Rotor | Zone | ID |
|---|---|---|---|---|---|---|---|---|
| Forward | 1 | 1 | Aft | 1 | 11 | Fwd/Aft | 1 | 21 |
|  | 2 | 2 |  | 2 | 12 | Tips | 2 | 22 |
|  | 3 | 3 |  | 3 | 13 |  | 3 | 23 |
|  | 4 | 4 |  | 4 | 14 |  | 4 | 24 |
|  | 5 | 5 |  | 5 | 15 |  |  |  |
|  | 6 | 6 |  | 6 | 16 |  |  |  |

An example energizing g sequence for an outside temperature of −20° C. may include zones 2, 3, 4, 1, 5, 6 for the inboard sections (to heat inward first and the outer areas), and outboard zones are fired in a 2, 3, 1, 4 sequence. The split zone system (inboard and outboard) allows the tip heaters to be fired in between each forward or aft heater sequence, keeping the blade tips free of ice. Higher pulse rates allow for the working sections of the blades to remain free from significant ice accretion and therefore maintain performance. As described above, in some example, if needed, the aft inboard zones can be removed from the icing sequence. This adds more pulses to the blade tips, allowing the aircraft to penetrate more severe icing conditions by removing the large portion of accreted ice. This could be tolerated for limited durations though since ice feathers could eventually build up in the aft sections of the inboard region and erode performance, thus requiring an occasional full heater cycle.

Within further examples, the split zone arrangement also has additional benefits. At lower temperatures, where ice accretions are reduced in the outboard portion of the blade, the tip pulses can be reduced as required so as to provide tip de-ice pulses only once a cycle.

Within further examples, the split zone arrangement also has additional benefits. The system can tolerate erosion protection materials with low thermal conductivity and high specific heat on the inboard sections of the blades. In one example use, since the system is intended to heat the rotor blade tips more frequently to maintain performance, the root section has more time to cool in between cycles. Cooling the blades in between de-ice cycles can help to avoid thermal creep in the blade internal structure and ice runback. Further, erosion protection materials with low thermal conductivity and high specific heat can take longer to cool, and within example uses, the multi-zone heater system can accommodate the longer cool times.

Within examples, utilizing the firing sequences described enables the control unit to divide power for heating a respective blade between the spanwise heater systems so as to reduce a peak power draw. The control unit may divide the power between the outboard spanwise heater systems and the inboard spanwise heater systems in about a two-thirds to one-third split, respectively, for example. If the power is divided between the inboard and outboard zones in a ⅔, ⅓ split, respectively, the rotor tips on both rotor hubs (for example, forward and aft) can be fired together and not increase the peak power demand.

Peak power reductions of electro thermal ice protection systems may thus be achieved with the split zone arrangement, in which two sets of elements are installed in the blade and fired independently. By heating the outer areas of the blade more frequently, ice thicknesses can be maintained (on average) lower, for example, within the working sections of the blade. When energizing the heater systems, element on time (EOT) may vary as a function of outside air temperature, such that for colder temperatures, EOT may be longer.

Figure 8:
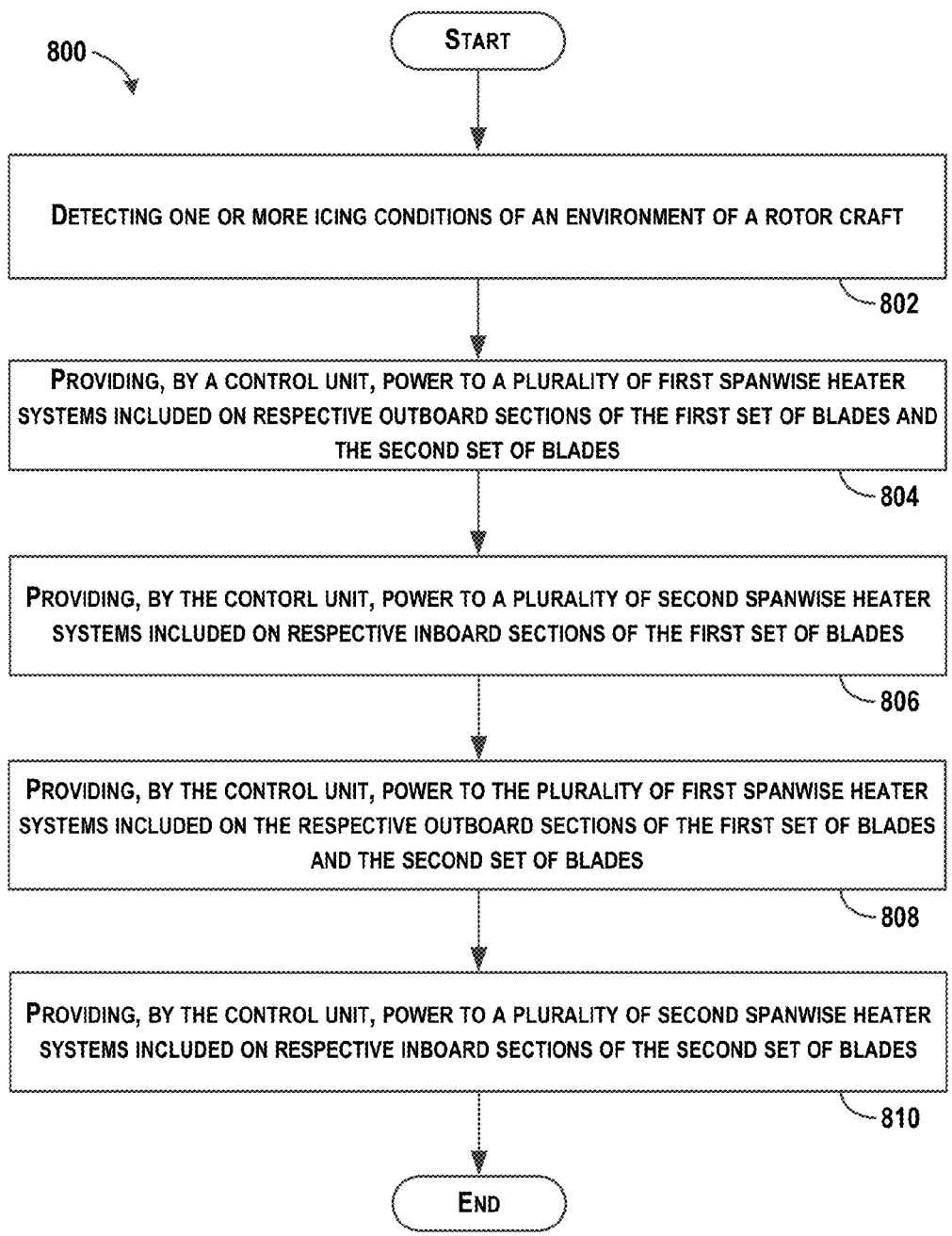
FIG. 8 shows a flowchart of an example method for operation of heater systems on a rotor craft, according to one embodiment.

FIG. 8 shows a flowchart of an example method 800 for operation of heater systems on a rotor craft, according to one embodiment. Method 800 shown in FIG. 8 presents an embodiment of a method that, for example, could be used with the system shown in FIG. 1, for example, and may be performed by a computing device (or components of a computing device), or may be performed by components of the rotorcraft according to instructions provided by the computing device. Thus, example devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions. Method 800 may include one or more operations, functions, or actions as illustrated by one or more of blocks 802-810. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 8 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 802, the method 800 includes detecting one or more icing conditions of an environment of a rotor craft. The rotor craft may include multiple blades coupled to a rotor and the multiple blades include a first set of blades and a second set of blades, and areas of the multiple blades are divided into sections such that a given blade includes an inboard section extending from the rotor outward and an outboard section extending from the inboard section to a tip of the given blade.

At block 804, the method 800 includes providing, by a control unit, power to a plurality of first spanwise heater systems included on respective outboard sections of the first set of blades and the second set of blades.

At block 806, the method 800 includes providing, by the control unit, power to a plurality of second spanwise heater systems included on respective inboard sections of the first set of blades.

At block 808, the method 800 includes providing, by the control unit, power to the plurality of first spanwise heater systems included on the respective outboard sections of the first set of blades and the second set of blades.

At block 810, the method 800 includes providing, by the control unit, power to a plurality of second spanwise heater systems included on respective inboard sections of the second set of blades.

Within examples, the method 800 may be repeated by providing power to respective heater systems until the one or more icing conditions of the environment are no longer present.

In still another example, in instances in which the rotor craft comprises multiple rotors including a forward rotor and an aft rotor, the forward rotor includes the first set of blades and the aft rotor (or the second rotor in a left/right or upper/lower set) includes the second set of blades. The method 800 may include providing power to outboard sections of the first set of blades on the forward rotor and the second set of blades on the aft rotor, followed by providing power to inboard sections of the second set of blades on the aft rotor, followed by providing power to the outboard sections of the first set of blades on the forward rotor and the second set of blades on the aft rotor, and lastly providing power to inboard sections of the first set of blades on the forward rotor.

Examples described herein enable a reduction in peak power demand for heating scenarios by reducing an amount of actively heated areas of the rotor blades. Dividing the zones between inboard and outboard (tip) regions limits a peak power requirement for the ice protection system, and lowers a size and/or weight of the aircraft generators. In addition, examples described herein shorten an ice protection sequence for the outboard sections of rotor blades and enables power to be shared between rotors to minimize the de-ice sequence.

In addition, using example configurations described, due to rotor blade tips having combinations of sweep, twist, anhedral/dihedral and chord changes, manufacturing of heater systems that can meet the geometric requirements is provided by dividing the heaters into two sections that can be manufactured and installed into complex tip sections. This allows for increased accuracy in the manufacturing process, within some examples.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for a rotor craft, the system comprising:
multiple blades coupled to a rotor and areas of the multiple blades divided into sections, wherein a given blade includes an inboard section extending from the rotor outward and an outboard section extending from the inboard section to a tip of the given blade;
a plurality of first spanwise heater systems included on respective outboard sections of the multiple blades;
a plurality of second spanwise heater systems included on respective inboard sections of the multiple blades; and
a control unit coupled to the plurality of first spanwise heater systems and the plurality of second spanwise heater systems, wherein respective heater systems of the sections of multiple blades are energized in a sequence based on outside air temperature, and wherein the sequence includes heating outboard sections of the multiple blades more frequently than heating inboard sections of the multiple blades.

2. The system of claim 1, wherein respective heater systems of the sections of multiple blades are energized in a sequence further based on an output of a water content sensor indicative of icing severity and the outside air temperature.

3. The system of claim 1, wherein the sequence is repeated until icing conditions are no longer present.

4. The system of claim 1, wherein the control unit divides power for heating a respective blade between the plurality of first spanwise heater systems and the plurality of second spanwise heater systems so as to reduce a peak power draw.

5. The system of claim 4, wherein the control unit divides the power between the plurality of first spanwise heater systems and the plurality of second spanwise heater systems in about a two-thirds to one-third split, respectively.

6. The system of claim 1, wherein the multiple blades include a first set of blades and a second set of blades, and wherein respective heater systems of the sections of the multiple blades are energized in a sequence comprising:

outboard sections of the first set of blades and the second set of blades;
inboard sections of the first set of blades;
the outboard sections of the first set of blades and the second set of blades; and
inboard sections of the second set of blades.

7. The system of claim 1, wherein respective heater systems of the sections of the multiple blades are energized in a chordwise manner from a leading edge to a trailing edge of a respective blade.

8. The system of claim 1, further comprising multiple rotors including a forward rotor and an aft rotor, wherein the rotor is one of the multiple rotors, wherein the forward rotor includes a set of the multiple blades and the aft rotor also includes a set of the multiple blades.

9. The system of claim 8, wherein respective heater systems of the sections of multiple blades are energized in a sequence comprising:
outboard sections of the set of multiple blades on the forward rotor and on the aft rotor;
inboard sections of the set of multiple blades on the aft rotor;
the outboard sections of the set of multiple blades on the forward rotor and on the aft rotor; and
inboard sections of the set of multiple blades on the forward rotor.

10. The system of claim 1, further comprising multiple rotors including a forward rotor and an aft rotor, wherein the rotor is one of the multiple rotors, wherein the forward rotor includes a set of the multiple blades and the aft rotor also includes a set of the multiple blades, and
wherein respective heater systems of the sections of multiple blades are energized in a sequence in which the plurality of second spanwise heater systems included on respective inboard sections of the multiple blades on the aft rotor are removed from the sequence allowing the outboard sections of the set of multiple blades on the forward rotor and on the aft rotor to be energized more frequently.

11. The system of claim 1, further comprising multiple rotors including a first rotor and a second rotor, wherein the rotor is one of the multiple rotors, wherein the first rotor includes a set of the multiple blades and the second rotor also includes a set of the multiple blades, and wherein respective heater systems of the sections of the multiple blades are energized in a chordwise manner such that:
for the outboard sections and the inboard sections of the set of multiple blades on the first rotor, sections are energized from a leading edge to a trailing edge of a respective blade; and
for the outboard sections and the inboard sections of the set of multiple blades on the second rotor, sections are energized from a leading edge to a trailing edge of a respective blade.

12. The system of claim 1, wherein, based on the outside air temperature being above a threshold value, the respective heater systems of the sections of multiple blades are energized in a sequence in which:
the plurality of first spanwise heater systems included on respective outboard sections of the multiple blades or the plurality of second spanwise heater systems included on respective inboard sections of the multiple blades are removed from the sequence.

13. A system comprising:
multiple blades coupled to a rotor and areas of the multiple blades divided into sections, wherein a given blade includes an inboard section extending from the rotor outward and an outboard section extending from the inboard section to a tip of the given blade;
a plurality of first spanwise heater systems included on respective outboard sections of the multiple blades;
a plurality of second spanwise heater systems included on respective inboard sections of the multiple blades; and
a control unit coupled to the plurality of first spanwise heater systems and the plurality of second spanwise heater systems, the control unit configured to cause respective heater systems of the sections of multiple blades to be energized in a sequence based on the sections being inboard or outboard and on one or more icing conditions of an environment of the system, and wherein the sequence includes heating outboard sections of the multiple blades more frequently than heating inboard sections of the multiple blades.

14. The system of claim 13, wherein the multiple blades include a first set of blades and a second set of blades, and wherein respective heater systems of the sections of the multiple blades are energized in a sequence comprising:
outboard sections of the first set of blades and the second set of blades;
inboard sections of the first set of blades;
the outboard sections of the first set of blades and the second set of blades; and
inboard sections of the second set of blades.

15. The system of claim 13, wherein respective heater systems of the sections of the multiple blades are energized in a chordwise manner from a leading edge to a trailing edge of a respective blade.

16. The system of claim 13, further comprising multiple rotors including a forward rotor and an aft rotor, wherein the rotor is one of the multiple rotors, wherein the forward rotor includes a set of the multiple blades and the aft rotor also includes a set of the multiple blades, and wherein respective heater systems of the sections of multiple blades are energized in a sequence comprising:
outboard sections of the set of multiple blades on the forward rotor and on the aft rotor;
inboard sections of the set of multiple blades on the aft rotor;
the outboard sections of the set of multiple blades on the forward rotor and on the aft rotor; and
inboard sections of the set of multiple blades on the forward rotor.

17. A method comprising:
detecting one or more icing conditions of an environment of a rotor craft, wherein the rotor craft includes multiple blades coupled to a rotor and the multiple blades include a first set of blades and a second set of blades, and wherein areas of the multiple blades are divided into sections such that a given blade includes an inboard section extending from the rotor outward and an outboard section extending from the inboard section to a tip of the given blade;
providing, by a control unit, power to a plurality of first spanwise heater systems included on respective outboard sections of the first set of blades and the second set of blades;
providing, by the control unit, power to a plurality of second spanwise heater systems included on respective inboard sections of the first set of blades;
providing, by the control unit, power to the plurality of first spanwise heater systems included on the respective outboard sections of the first set of blades and the second set of blades; and providing, by the control unit, power to a plurality of second spanwise heater systems included on respective inboard sections of the second set of blades, wherein respective heater systems are energized in a sequence that includes heating outboard sections of the multiple blades more frequently than heating inboard sections of the multiple blades.

18. The method of claim 17, further comprising repeating a sequence of providing power to respective heater systems until the one or more icing conditions of the environment are no longer present.

19. The system of claim 13, wherein, based on an outside air temperature being above a threshold value, the respective heater systems of the sections of multiple blades are energized in a sequence in which:

the plurality of first spanwise heater systems included on respective outboard sections of the multiple blades or the plurality of second spanwise heater systems included on respective inboard sections of the multiple blades are removed from the sequence.

20. The system of claim 13, further comprising multiple rotors including a forward rotor and an aft rotor, wherein the rotor is one of the multiple rotors, wherein the forward rotor includes a set of the multiple blades and the aft rotor also includes a set of the multiple blades, and wherein respective heater systems of the sections of multiple blades are energized in a sequence in which the plurality of second spanwise heater systems included on respective inboard sections of the multiple blades on the aft rotor are removed from the sequence allowing the outboard sections of the set of multiple blades on the forward rotor and on the aft rotor to be energized more frequently.

* * * * *